United States Patent [19]

Brock et al.

[11] Patent Number: 4,679,642

[45] Date of Patent: Jul. 14, 1987

[54] SPRING-TYPE ADJUSTABLE MOUNTING FOR WEIGHING SCALE FLEXURES

[75] Inventors: Marilyn A. Brock, Morris Plains; Daniel G. Scheffer, Rockaway Township, Morris County, both of N.J.

[73] Assignee: Ohaus Scale Corporation, Florham Park, N.J.

[21] Appl. No.: 892,326

[22] Filed: Aug. 4, 1986

[51] Int. Cl.⁴ .................. G01G 23/14; G01G 3/08
[52] U.S. Cl. ................................ 177/164; 177/229
[58] Field of Search ................ 177/164, 229, 255

[56] References Cited

U.S. PATENT DOCUMENTS

| | | | |
|---|---|---|---|
| 3,494,435 | 2/1970 | Rouban | 177/110 |
| 4,071,104 | 1/1978 | Macari et al. | 177/229 |
| 4,109,738 | 8/1978 | Kunz | 177/212 |
| 4,153,126 | 5/1979 | Knothe et al. | 177/229 |
| 4,382,479 | 5/1983 | Lee et al. | 177/189 |
| 4,383,586 | 5/1983 | Lee | 177/229 |
| 4,497,386 | 2/1985 | Meier | 177/229 |

FOREIGN PATENT DOCUMENTS 7115570 9/1971 Fed. Rep. of Germany .

Primary Examiner—George H. Miller, Jr.
Attorney, Agent, or Firm—Robert R. Jackson

[57] ABSTRACT

A differential spring mechanism is provided for allowing very fine adjustments of the position of at least one flexure mounting in a weighing scale. Most of the motion of a control device is absorbed by a first relatively weak spring, leaving only a relatively small portion of that motion to be absorbed by a second relatively strong spring to which the flexure mounting is connected.

7 Claims, 7 Drawing Figures

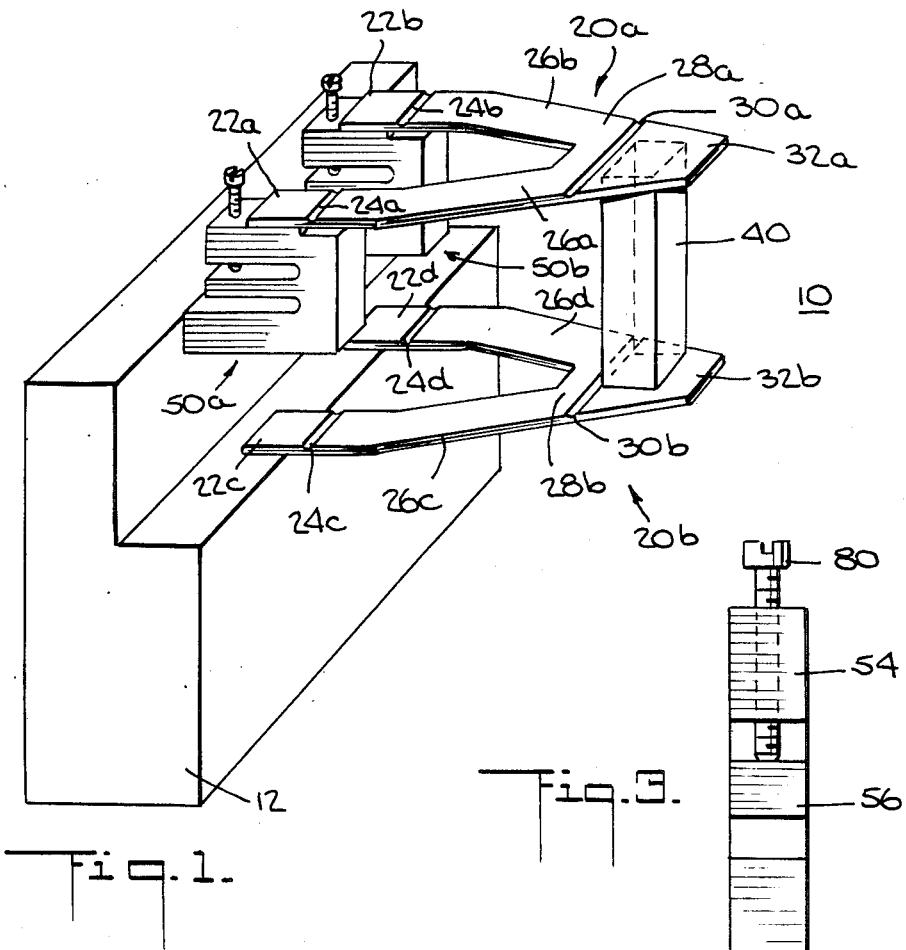
Fig.1.
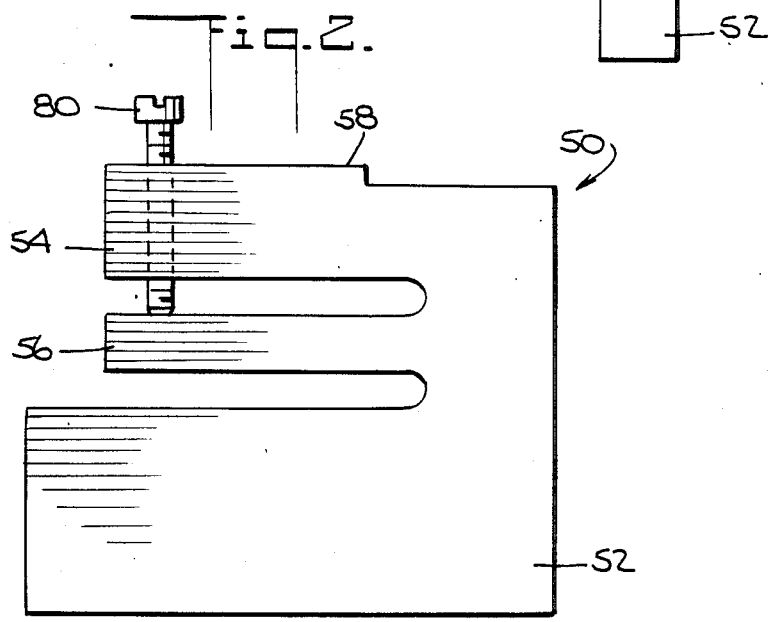
Fig.2.
Fig.3.

SPRING-TYPE ADJUSTABLE MOUNTING FOR WEIGHING SCALE FLEXURES

BACKGROUND OF THE INVENTION

This invention relates to weighing scales, and more particularly to adjustment mechanisms for the mountings of the flexures in such scales.

Weighing scales with parallel, V-shaped or triangular flexures are well known, as shown, for example, in Lee U.S. Pat. No. 4,383,586. Exact parallelism of the flexures in such scales is extremely important for satisfactory operation of the scale. Scales of this type therefore typically have some kind of mechanism for adjusting the location of one or more of the flexure mountings to ensure parallelism of the flexures. For example, in the Lee patent, upper flexure mountings 136b and 136c are respectively mounted on elongated members 124 and 126 which can be pivoted by screws 130 and 131 to adjust the vertical locations of mountings 136b and 136c. While the Lee structure is said to have the advantage of permitting "vernier control" of the locations of the flexure mountings, the Lee structure is also fairly large and bulky.

A more common type of flexure mounting adjustment is shown in Knothe et al. U.S. Pat. No. 4,153,126. In Knothe FIGS. 3 and 4 upper flexure mountings 9a are adjustable by rotation of adjusting screws 10. However, it is extremely difficult to achieve fine adjustments with a structure of this type. Adjusting screws of very small pitch are relatively expensive, and even with such screws only a relatively coarse adjustment is possible.

In view of the foregoing, it is an object of this invention to improve the adjustment mechanisms for the flexure mountings in weighing scales.

It is a more particular object of this invention to provide relatively small flexure mounting adjustment mechanisms which allow extremely fine adjustments over a wide range without the use of excessively costly components.

SUMMARY OF THE INVENTION

These and other objects of the invention are accomplished in accordance with the principles of the invention by connecting the flexure mounting to be adjusted to the rigid base of the frame of the scale via a first relatively strong spring member. A relatively coarse control device such as an adjustment screw acts to deflect the first spring in cooperation with a second relatively weak spring so that a major portion of each increment of motion of the control device is absorbed by the second spring, while only a minor portion is absorbed by the first spring to which the flexure mounting is connected. A relatively coarse control device can therefore be used to produce very fine adjustments of the flexure mounting.

Further features of the invention, its nature and various advantages will be more apparent from the accompanying drawings and the following detailed description of the invention.

BRIEF DESCRIPTION OF THE DRAWINGS

FIG. 1 is a simplified perspective view of a portion of a weighing scale constructed in accordance with the principles of this invention.

FIG. 2 is a side elevational view of the adjustment device employed in the apparatus of FIG. 1.

FIG. 3 is an end elevational view of the adjustment device of FIG. 2.

DETAILED DESCRIPTION OF THE INVENTION

Figure 3A:
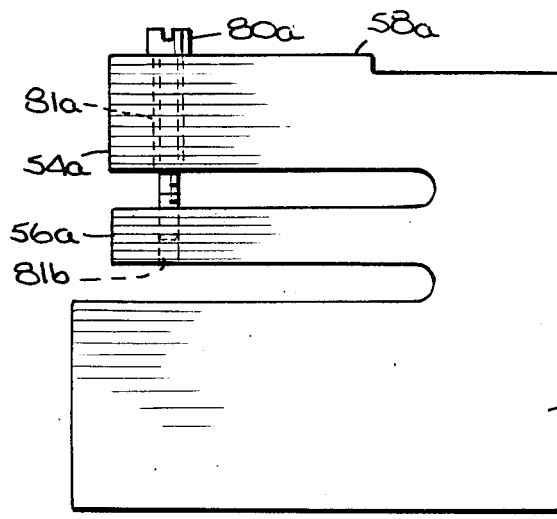
FIG. 3A is a view similar to FIG. 2 showing an alternative embodiment of the adjustment device of this invention.

As shown in FIG. 1, a top loading scale of the type shown, for example, in the above-mentioned Knothe and Lee patents typically includes a flexure system 10 comprising a portion 12 of the rigid base of the scale on which two vertically spaced, parallel, horizontal flexures 20a and 20b are mounted. Each flexure 20 includes two laterally spaced mounting tabs 22a, 22b, 22c, and 22d, each of which is connected to an associated flexure arm 26a, 26b, 26c, and 26d by a flexural hinge 24a, 24b, 24c, and 24d. The mounting tabs 22c and 22d of flexure 20b are connected directly to base portion 12. The mounting tabs 22a and 22b of flexure 20a are respectively connected to base portion 12 via identical adjustment devices 50a and 50b.

The ends of the arms 26 of each flexure 20 remote from mounting tabs 22 converge toward one another and interconnect at 28a and 28b. Each interconnected portion 28a and 28b is respectively connected to another mounting tab 32a and 32b via another flexural hinge 30a and 30b. Mounting tabs 32 are interconnected by vertical post 40. In a typical top loading scale, post 40 supports a weighing pan (not shown, but entirely conventional) and conveys the load of that pan and the object to be weighed to a transducer mechanism (also not shown, but also entirely conventional; see, for example, the above-mentioned Knothe patent which shows both a typical weighing pan and a typical transducer). Flexure members 20 are intended to ensure that post 40 can only move vertically.

In order for flexures 20 to perform their vertical guidance function without introducing errors into the resulting weight readings, especially when the object to be weighed is not exactly vertically aligned with post 40, flexures 20 must be exactly parallel to one another. As will now be described, adjustment devices 50 allow very fine adjustments of the vertical locations of mounting tabs 22a and 22b to facilitate attainment of the required parallelism between flexures 20.

Each adjustment device 50 (shown in more detail in FIGS. 2 and 3) is a differential leaf spring mechanism having a base portion 52, a first relatively strong spring 54 cantilevered from the base portion, and a second relatively weak spring 56 also cantilevered from the base portion. Base portion 52 is connected to scale base portion 12. A flexure mounting tab 22 is connected to a portion of spring 54 designated output portion 58. A control device (e.g., screw 80) is threaded through spring 54 so that its lower end bears on spring 56. Except for screw 80, adjustment device 50 is preferably machined from a single piece of plate metal (e.g., spring material such as aluminum, beryllium copper, or stainless steel having a coefficient of thermal expansion similar to that of vertical post 40).

Spring 56 is substantially weaker than spring 54 because its vertical cross sectional dimension is substantially less than the corresponding dimension of spring 54. In other words, spring 54 has a relatively high spring constant, while spring 56 has a relatively low spring constant. Accordingly, when screw 80 is tightened, spring 56 deflects downwardly substantially more than spring 54 deflects upwardly. Thus a relatively coarse adjustment of screw 80 can be used to produce a very fine adjustment of the vertical location of mounting tab 22.

FIG. 3A shows an alternative embodiment of the invention in which screw 80a passes through a clearance hole 81a in spring 54a and is threaded into a hole 81b in spring 56a. The head of screw 80a bears on the upper surface of spring 54a. Accordingly, when screw 80a is tightened, it pulls spring 54a down by a lesser amount than it pulls spring 56a up. The embodiment of FIG. 3A is therefore similar to the embodiment of FIGS. 1-3 except that the directions of motion of springs 54a and 56a are respectively reversed from the directions of motion of springs 54 and 56 when the associated screws are tightened.

Figure 4:
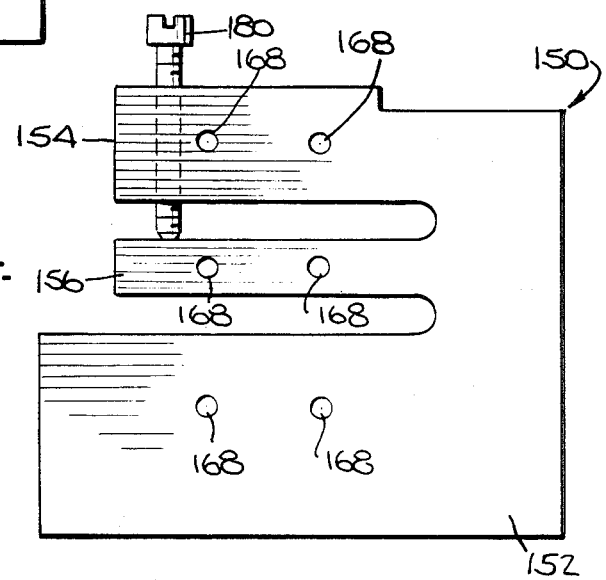
FIG. 4 is a view similar to FIG. 2 showing another alternative embodiment of the adjustment device of this invention.
Figure 5:
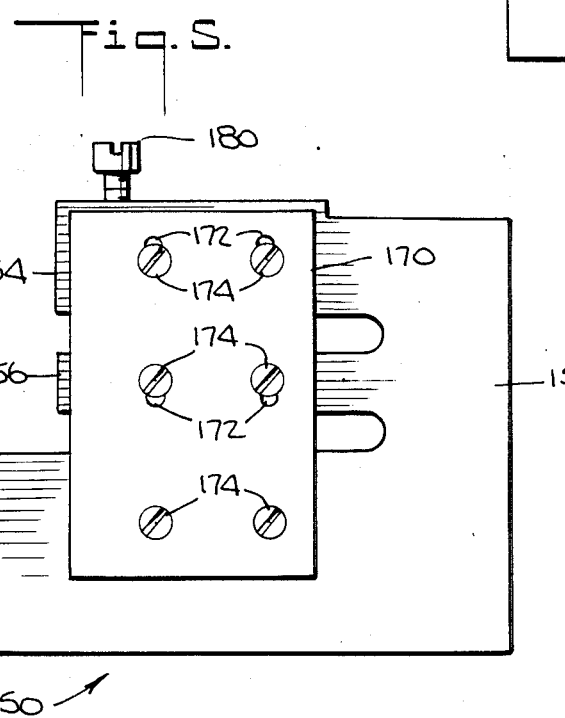
FIG. 5 is a another similar view of the adjustment device of FIG. 4 with additional elements added.

FIGS. 4 and 5 illustrate another feature of the invention. Adjustment device 150 (which may otherwise be substantially identical to adjustment device 50) can be provided with pretapped holes 168 in each of base portion 152, spring 154, and spring 156. After adjustment device 150 has been adjusted as desired by rotation of screw 180, fixing plate 170 can be secured to the side of adjustment device 150 by means of screws 174 as shown in FIG. 5. The shanks of screws 174 pass freely through apertures 172 in fixing plate 170 and are threaded into holes 168. The apertures 172 aligned with the holes 168 in the movable parts 154 and 156 of adjustment device 150 are somewhat elongated in the direction in which those holes move during adjustment of device 150. When all of screws 174 are tightened, fixing plate 170 helps prevent any subsequent undesired movement of adjustment device 150.

Figure 6:
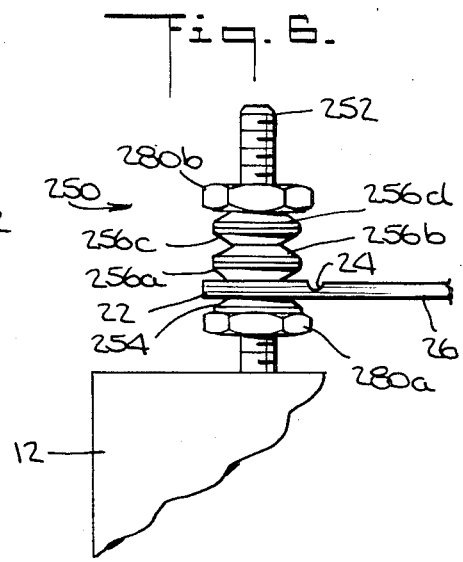
FIG. 6 is a view similar to FIG. 2 showing still another alternative embodiment of the adjustment device of this invention.

The springs employed in the differential spring mechanisms of this invention need not be cantilevered leaf-type springs as in the embodiments of FIGS. 1-5. For example, FIG. 6 shows an alternative embodiment in which dish-shaped washers, sometimes known as Belleville washers, are employed as the spring members. As shown in FIG. 6, a threaded post 252 projects upwardly from scale base portion 12 at the location of each mounting tab 22 to be adjusted. A base nut 280a is threaded onto post 252, and a single Belleville washer 254 is placed around post 252 above nut 280a with its concave side down. Mounting tab 22, which has a hole slightly larger than post 252, is then placed on post 252 so that its lower surface rests on the uppermost portion of the convex surface of washer 254. Additional Belleville washers 256a, 256b, 256c, and 256d are then placed on post 252 so that washer 256a is concave upward, washer 256b is concave downward, washer 256c is concave upward, and washer 256d is concave downward. Finally, a second nut 280b is threaded onto post 252. Accordingly mounting tab 22 is connected in series between a first relatively strong spring (washer 254) and a second relatively weak spring (washers 256 collectively). Nut 280a acts on the first spring at a point remote from mounting tab 22, while nut 280b acts on the second spring at another point remote from mounting tab 22.

Assuming that washers 254 and 256 are compressed between nuts 280a and 280b, most of the upward or downward motion of nut 280a will result in corresponding upward or downward motion of mounting tab 22 because only a single washer 254 separates mounting tab 22 from nut 280a. Accordingly, nut 280a provides a relatively coarse adjustment of the vertical location of mounting tab 22. On the other hand, only a relatively small fraction of any upward or downward motion of nut 280b will be transferred to mounting tab 22 because four washers 256 separate mounting tab 22 from nut 280b. Approximately 80% of the motion of nut 280b is absorbed by washers 256, while the remaining 20% is absorbed by washer 254. Accordingly, mounting tab 20 moves only 20% as much as nut 280b. Nut 280b therefore provides a relatively fine adjustment of the vertical location of mounting tab 22.

It will be understood that the foregoing is merely illustrative of the principles of the invention, and that various modifications can be made by those skilled in the art without departing from the scope and spirit of the invention. For example, coil springs could be used in place of Belleville washers in the embodiment of FIG. 6.

We claim:

1. Apparatus for adjusting the position of a flexure mounting in a weighing scale having a base and at least one flexure mounting comprising:
   first spring means for resiliently connnecting the flexure mounting to the base, said first spring means having a relatively high spring constant;
   second spring means having a relatively low spring constant; and
   control means movable relative to said base and operatively connected to said first and second spring means so that most of the motion of said control means results in deflection of the second spring means and only a minor portion of said motion results in deflection of the first spring means and the flexure mounting.

2. The apparatus defined in claim 1 wherein each of the first and second spring means comprises a cantilevered leaf spring member, and wherein the control means comprises an adjustment screw threaddedly connected to at least one of said members and in contact with the other of said members for changing the spacing between said members.

3. The apparatus defined in claim 1 wherein the flexure mounting is connected in series between the first and second spring means, and wherein said control means acts on the second spring means at a point remote from the flexure mounting.

4. The apparatus defined in claim 3 wherein the control means comprises an adjustment nut which acts on the second spring means at a point remote from the flexure mounting.

5. The apparatus defined in claim 1 further comprising:
   second control means movable relative to said base and operatively connected to said first spring means so that most of the motion of said second control means results in deflection of the first spring means and the flexure mounting.

6. The apparatus defined in claim 3 further comprising:
   second control means movable relative to said base and operatively connected to said first spring means at a point remote from the flexure mounting.

7. The apparatus defined in claim 1 further comprising:
   means for fixing the first spring means relative to the base after the position of the flexure mounting has been adjusted as desired.

* * * * *